US011184300B2

United States Patent
Batiz et al.

(10) Patent No.: US 11,184,300 B2
(45) Date of Patent: Nov. 23, 2021

(54) ENCODING AND DISTRIBUTING SNIPPETS OF EVENTS BASED ON NEAR REAL TIME CUES

(71) Applicant: OATH (AMERICAS) INC., New York, NY (US)

(72) Inventors: Jaime Batiz, Campbell, CA (US); Niklas Karlsson, Mountain View, CA (US)

(73) Assignee: VERIZON MEDIA INC., New York, NY (US)

( * ) Notice: Subject to any disclaimer, the term of this patent is extended or adjusted under 35 U.S.C. 154(b) by 1144 days.

(21) Appl. No.: 14/949,564

(22) Filed: Nov. 23, 2015

(65) Prior Publication Data
US 2017/0149704 A1 May 25, 2017

(51) Int. Cl.
*H04L 12/58* (2006.01)
*H04L 29/06* (2006.01)
*G06Q 30/08* (2012.01)
*H04L 29/08* (2006.01)
*G06Q 50/00* (2012.01)

(52) U.S. Cl.
CPC .......... *H04L 51/046* (2013.01); *G06Q 30/08* (2013.01); *H04L 51/10* (2013.01); *H04L 51/32* (2013.01); *H04L 65/4084* (2013.01); *H04L 65/607* (2013.01); *H04L 65/80* (2013.01); *H04L 67/22* (2013.01); *G06Q 50/01* (2013.01)

(58) Field of Classification Search
CPC ............ H04N 21/2668; H04N 21/251; H04N 21/25883; H04N 21/25891; H04N 21/44008; H04N 21/44222; H04N 21/4828; H04N 21/858
USPC ........................................................... 725/18
See application file for complete search history.

(56) References Cited

U.S. PATENT DOCUMENTS

| | | | |
|---|---|---|---|
| 8,370,380 B1* | 2/2013 | Kuraoka | G06F 16/3323 707/767 |
| 9,509,798 B1* | 11/2016 | Thomas | H04L 67/32 |
| 9,578,358 B1* | 2/2017 | Skolicki | H04N 21/252 |
| 10,057,651 B1* | 8/2018 | Singh | H04N 21/4394 |
| 2007/0106685 A1* | 5/2007 | Houh | G06F 16/43 |
| 2015/0339382 A1* | 11/2015 | Skolicki | G06F 16/739 707/722 |
| 2015/0370902 A1* | 12/2015 | Oztaskent | G06F 16/9535 707/770 |

* cited by examiner

*Primary Examiner* — Alfonso Castro
(74) *Attorney, Agent, or Firm* — Cooper Legal Group, LLC (57) ABSTRACT

Moments of interest of an event may be automatically detected, encoded as snippets, and distributed to users subscribed to a channel of this event. In various embodiments, a moment of interest of an event is to be automatically detected, e.g., based on a near real-time cue on a social network or features in the event transmission. Further, a snippet can be encoded from the transmission of the event based on the detected moment of interest. The snippet may be put on a market place to be bid by various content distributors. Eventually, the snippet may be distributed to an interested user, e.g., via a channel subscribed by the user. Other embodiments may be described and/or claimed.

13 Claims, 6 Drawing Sheets

ENCODING AND DISTRIBUTING SNIPPETS OF EVENTS BASED ON NEAR REAL TIME CUES

TECHNICAL FIELD

The present disclosure relates generally to computing. More specifically, and without limitation, the present disclosure relates to systems and methods for encoding and distributing snippets of live events based on near real-time cues.

BACKGROUND

A live event (e.g., a game, a concert, etc.) may be transmitted with minimal delay (e.g., broadcast via air or cable, live stream via Internet, etc.) while the event is being performed at the time of hearing or viewing by the audience. Watching a live event is usually an enjoyable experience; however, it requires the audience to be synchronized in time with the live event. As a result, many people miss out on live events that they are interested in due to scheduling conflicts, or the like. Further, although a live event can be recorded and viewed afterwards, many people actually are more interested in the highlights of the live event rather than all details of the full-length event. For example, soccer viewers may be interested in goal-scoring moments, football viewers may be interested in moments related to a touchdown or a field goal, baseball viewers may be interested in a home run, basketball viewers may be interested in moments related to a field goal of their favorite teams or players.

When a live event (e.g., a game) is ongoing, people often discuss about the highlights of the live event, e.g., via social networks. A social network is a social structure made up of a set of social actors and a set of connections that ties these social actors together. Social networks are pervasive in our modern day life. Just to name a few examples, well-known social networks includes Facebook®, Twitter®, LinkedIn®, Pinterest®, Google Plus+®, Tumblr®, Instagram®, etc. Often, one may learn about the highlights of a live event via one or more social networks. However, one cannot easily locate and watch those highlights shortly after they have happened.

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, modules, blocks, steps, etc., similar to the ones described in this document, in conjunction with other present or future technologies.

As discussed previously, many people miss out live events that they are interested in due to scheduling conflicts, or the like. Further, they may be interested in watching those highlights in these live events shortly after those highlights occur. Meanwhile, people are made aware of those highlights in near real time with a minimal delay, e.g., via social networks. This disclosure enables users to locate and watch video clips ("snippets" hereinafter) of those highlights in live events (also referred as "moments of interest" hereinafter) based on cues on various social networks.

In various embodiments, this disclosure enables a moment of interest of a live event to be automatically detected, e.g., based on a near real-time (NRT) cue on a social network. NRT refers to shortly after a live event took place, e.g., a few minutes. Further, this disclosure enables a snippet to be encoded from the transmission of the live event (e.g., a live broadcast via a cable network) based on the detected moment of interest. Then, the snippet may be distributed to an interested user, e.g., via a channel subscribed to by the user.

In one embodiment, the encoding and distribution network (EDN) for such snippets may be connected to various social networks. On one hand, the NRT cues on social networks may be monitored by the EDN, e.g., to be used to determine a moment of interest of a live event. On the other hand, the EDN may distribute a snippet via social networks. As an example, an anchor (e.g., the URL to the snippet) may be embedded within various discussions on the social networks related to the live event or specifically the moment of interest of the live event associated with the snippet. As a result, users on the social networks may easily navigate to such snippets based on their existing social network infrastructure.

Meanwhile, a market place may be set up for licensees to encode the snippets from live events and offer such snippets in various distribution channels to content distributors. By way of example, a licensee who created a snippet may offer it to the highest bidder in a real-time automated auction. On the other hand, content distributors may bid on a snippet based on the anticipated popularity of the snippet.

In some embodiments, this disclosure includes an application on a computing device (e.g., an app on a smartphone), which would enable the user to subscribe to various channels that the user would like to follow. By way of example, each channel may be continuously replenished with snippets of those highlights in live events, which may have just happened, e.g., up to a few minutes ago. As a result, the user may watch those near real time snippets and/or most recent highlights in live events. It is contemplated that various embodiments disclosed herein for encoding and distributing selective snippets of live events are certainly applicable for encoding and distributing snippets of live events without various challenges introduced by the time constraint of NRT, e.g., with longer permissible delays.

Further, by way of example, a list of snippets related to various live events may also be made available, e.g., through thumbnails, to be browsed by the user. Even further, the user may also search the "channels" and locate those snippets related to a particular live event interested by the user.

As used here, the term "device" refers to any computing equipment or other electronic equipment that executes instructions and includes any type of processor-based equipment that operates an operating system or otherwise executes instructions. A device will typically include at least a processor that executes program instructions and may include external or internal components such as a mouse, a CD-ROM drive, DVD drive, a keyboard, a display, or other input or output equipment. Examples of devices are personal computers, digital assistants, personal digital assistants, cellular phones, mobile phones, smart phones, pagers, digital tables, laptop computers, tablet computers, Internet appliances, other processor-based devices, and television viewing devices. A device is to be used as a special purpose computing device to provide specific functionality offered by applications and modules, such as for NRT encoding and distributing selective snippets of live events.

In various embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In various embodiments, a module may be implemented in firmware, hardware, software, or any combination of firmware, hardware, and software.

Although the terms "step" and/or "block" may be used herein to connote different elements of methods employed, the terms should not be interpreted as implying any particular order among or between various steps herein disclosed unless and except when the order of individual steps is explicitly described. Further, various operations may be described as multiple discrete actions or operations in turn, in a manner that is most helpful in understanding the claimed subject matter. However, various additional operations may be performed, and/or described operations may be omitted or combined in other embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in an embodiment," "in another embodiment," "in various embodiments," or the like, which may each refer to one or more of the same or different embodiments. Furthermore, the terms "comprising," "including," "having," and the like, as used with respect to embodiments of the present disclosure, are synonymous.

Figure 1:
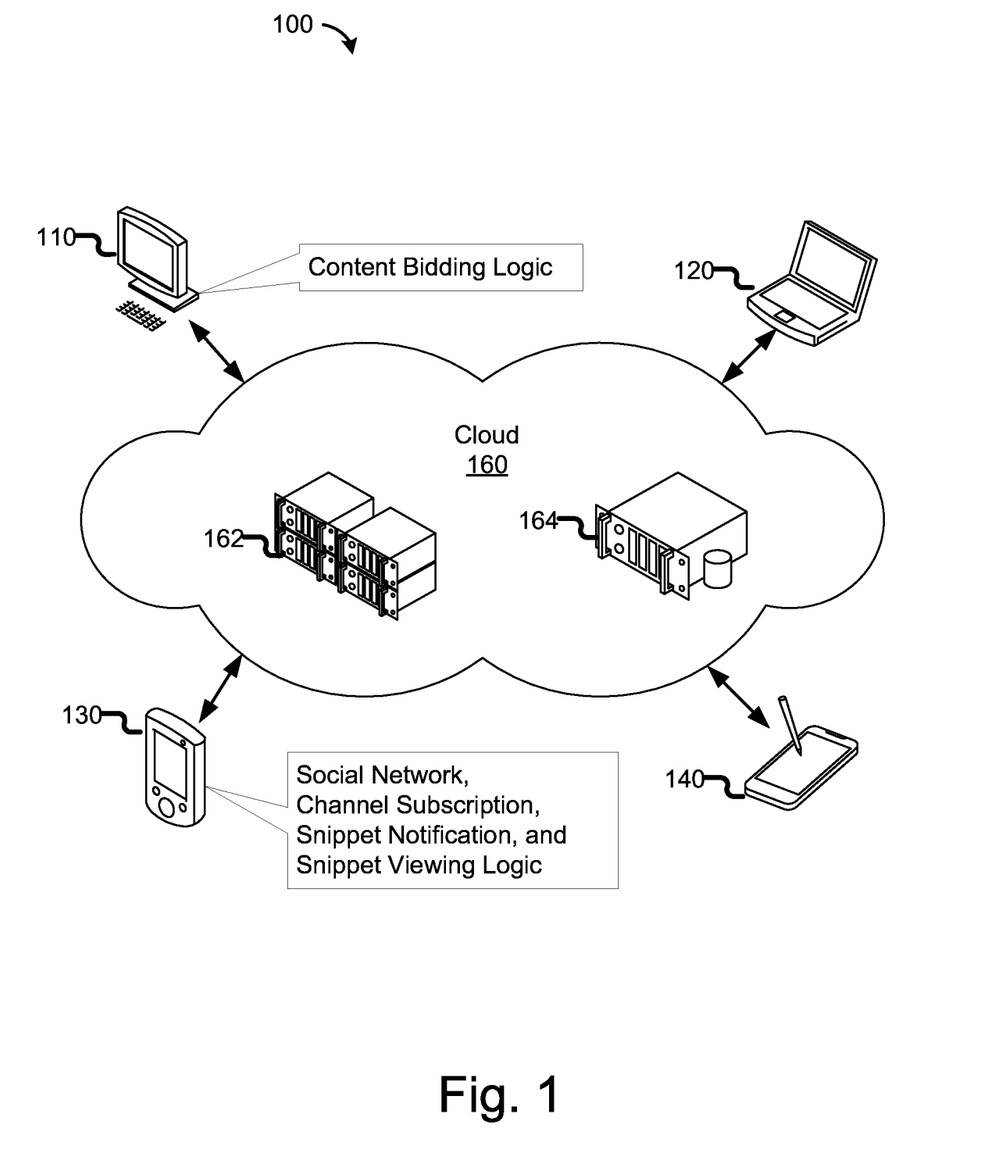
FIG. 1 is a schematic diagram illustrating an example system configuration for encoding and distributing selective snippets of live events, incorporating aspects of the present disclosure, in accordance with various embodiments.

With reference now to FIG. 1, an example system configuration for encoding and distributing selective snippets of live events, in accordance with various embodiments, is illustrated. System 100 includes various user devices that can access service devices in system 100 via a network. As illustrated in FIG. 1, user devices include, e.g., desktop computer 110, mobile computer 120, smartphone 130, or tablet 140.

User devices are to be configured to connect to a server device in computing cloud 160 (hereinafter, cloud 160), such as server 162 and data server 164, via wired or wireless connections. These wireless or wired networks may include public and/or private networks, such as, but not limited to, LANs, WANs, or the Internet. In some embodiments, these wireless networks may include one or more WPANs, WLANs, WMANs, or WWANs. In some embodiments, these wireless networks may include cellular networks, for example, Wideband Code Division Multiple Access (WCDMA), Global System for Mobile Communications (GSM), Long Term Evolution (LTE), and the like.

Server 162 includes application servers, which can perform application related logic, while data server 164 is to be configured to provide data services. In some embodiments, server 162 and data server 164 may be integrated as one server. As will be described in more detail below, some user devices may be configured to access social networks, subscribe to various channels associated with live events, receive notifications related to snippets from live events, and view selected snippets. Some user devices may be further configured to bid on content from cloud 160, such as newly generated snippets from live events. Meanwhile, server devices may perform encoding and distributing selective snippets of live events based on NRT cues. In some embodiments, server devices may be further configured to enable bidding on snippets generated from live events.

In operation, and at a high level, some user devices, e.g., smartphone 130 or tablet 140, may be configured to access various social networks, such as Facebook® or Twitter®, and users of these user devices may post various updates or discussions related to a live event. Meanwhile, server 162 may monitor various social networks' feeds. Some feeds on social networks are public, thus can be monitored by server 162 without any user's permissions. Some feeds on social networks are non-public, thus server 162 may obtain users' permission to monitor such feeds. In one embodiment, an application distributed by server 162 may be installed to some user devices, and the application then can monitor social network feeds to these user devices. In another embodiment, an application distributed by server 162 may be installed to some user devices, and the application then can facilitate those user devices to view a selected snippet generated by server 162.

Server 162 may identify a set of keywords associated with characteristics of a live event. As an example, for a live football game, a set of keywords may include the location of the game, the names of the teams, some players' name, and specific technical terms (e.g., touchdown, field goal, etc.). Further, server 162 may monitor NRT cues on the social network for a moment of interest based on, e.g., the set of predetermined keywords. In various embodiments, the moment of interest may be determined heuristically, e.g., based on an occurrence of a spike of one or more keywords on one or more social networks. Upon determining the moment of interest of the live event, server 162 may encode a snippet from a transmission of the live event based on the moment of interest.

The snippet may then be distributed to various users or content bidders in various embodiments. In some embodiments, the snippet will be distributed to various content distributors based on their respective contracts with the licensee who generated the snippet. In some embodiments, a content distributor may set up bidding logic in server 162 or another server (not shown) to automatically complete a bidding transaction to win the snippet. The content provider may also use the content bidding logic at a user device, e.g., desktop computer 110, to automatically or manually bid on the snippet.

In some embodiments, server 162 may determine a starting offering price based on the amplitude of the spike on the social networks associated with the snippet. The amplitude of the spike may be measured by the number of occurrences of the keywords being monitored in a time window (e.g., 5 minutes), the frequency of the occurrence of keywords being monitored, etc. In general, a relatively high amplitude of the spike may be correlated to a relatively great interest of the public towards the snippet. Accordingly, the starting offering price for the snippet may be set higher depending on the amplitude of the spike. The starting offering price herein refers to the lowest price the content owner is willing to sell the snippet, which is usually set up by the content owner or its agents.

In some embodiments, the information related to the snippet, such as, for example, the amplitude of the spike, may be made available to the content distributors or other bidders for the snippet. Therefore, the content distributor may also utilize such information in determining their bidding prices. As an example, a high amplitude of the spike may indicate more prospective sales of the snippet through a content distributor's network. Thus, the content distributor may want to bid higher for this snippet.

In various embodiments, a user device, such as smartphone 130, may enable a user to subscribe to various channels that the user would like to follow, e.g., via an app on smartphone 130. Each channel may be continuously replenished with snippets of those highlights in live events, e.g., after a content distributor wins bids on those snippets or receives those snippets based on a contract. As a result, a user may watch those snippets of live events on a user device.

While not illustrated, user devices in system 100 may also include an audio and/or video player, a gaming device, a video camera, a digital camera, a navigation device, a radio, and/or other suitable user electronic devices. A user device may communicate with cloud 160, facilitate server 162 to encode and distribute snippets of live events, and enable a user to view such snippets, as described herein.

In some embodiments, server 162 may further integrate its snippet distribution network with social networks. As an example, an anchor (e.g., the URL to the snippet) may be associated to various discussions on the social networks related to the live event or specifically the moment of interest of the live event associated with the snippet. As another example, a user that has subscribed to a channel of a live event may get special feeds related to the live event from the user's social networks. As yet another example, a user subscribed to a channel of a live event may be permitted to forward a sharable link of the snippet to the user's social networks. Advantageously, users on the social networks may easily access such snippets based on their existing social network infrastructure and their subscription to various channels of these snippets.

Figure 2:
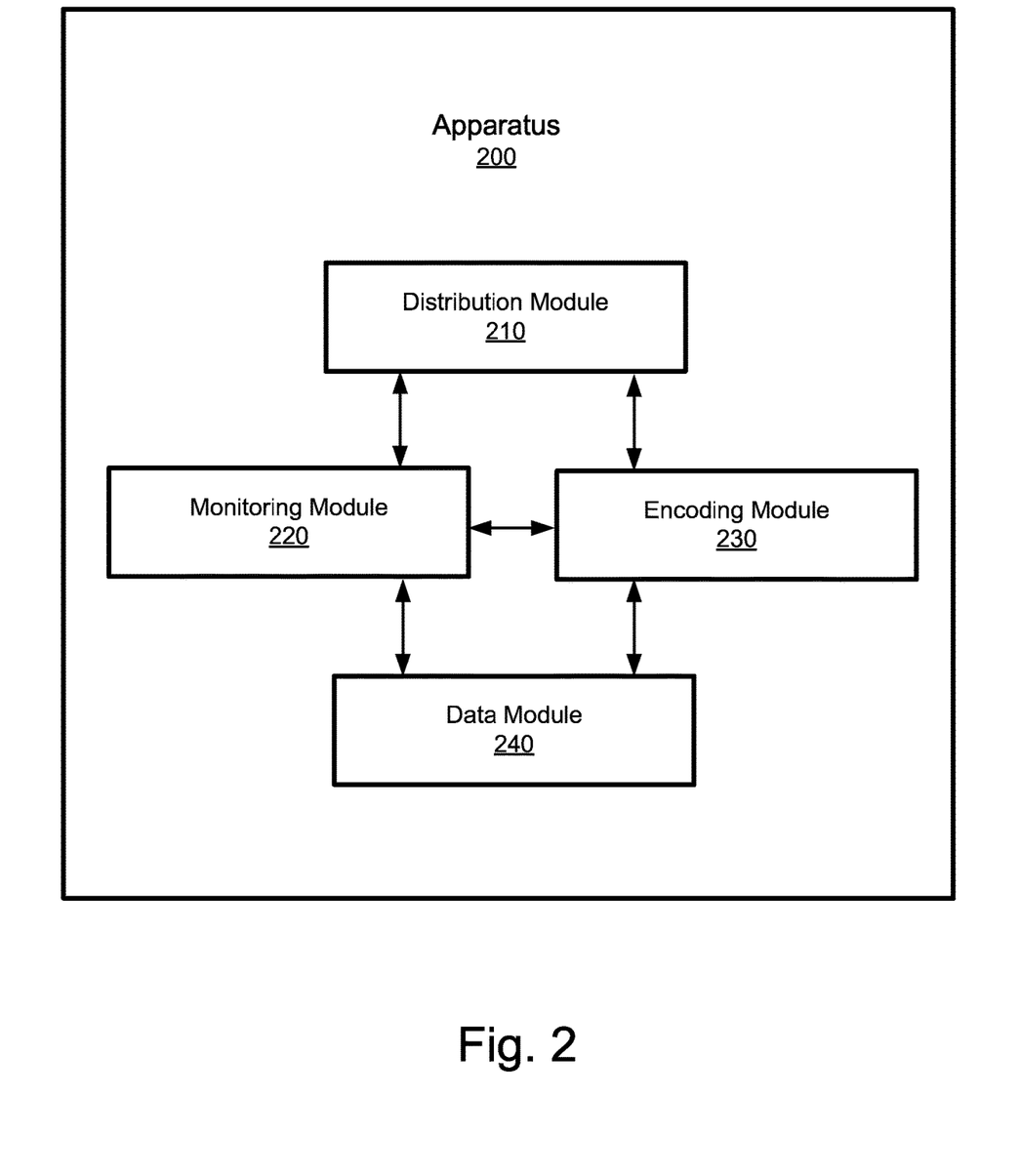
FIG. 2 is a schematic diagram illustrating an example implementation of an apparatus for encoding and distributing selective snippets of live events, incorporating aspects of the present disclosure, in accordance with various embodiments.

Referring now to FIG. 2, a schematic diagram illustrates an example implementation of apparatus 200 for encoding and distributing selective snippets of live events in accordance with various embodiments. In embodiments, apparatus 200 may be a server computing device, such as server 162 in FIG. 1. Apparatus 200 can encode and distribute selective snippets of live events. As illustrated in FIG. 2, apparatus 200 includes distribution module 210, monitoring module 220, encoding module 230, and data module 240, operatively coupled with each other.

In various embodiments, monitoring module 220 can detect moments of interest of a live event. In some embodiments, monitoring module 220 may detect a moment of interest of the live event based on a feature in a video, e.g., based on machine learning techniques to detect a feature of "soccer ball passing completely over the goal line between the goal posts" or "soccer ball hitting the net attached behind the goal frame." In some embodiments, monitoring module 220 may detect a moment of interest of the live event based on NRT cues on one or more social networks. NRT cues on a social network may include a group of keywords associated with various characteristics of the live event. Monitoring module 220 may first identify the group of keywords associated with the characteristics of the live event. By way of example, the Super Bowl is the annual championship game of the National Football League (NFL), which is the highest level of professional football in the United States. A group of keywords related to a Super Bowl event may be identified by editors and manually input to monitoring module 220, or may be automatically discovered by monitoring module 220 based on machine learning or various statistical tools, e.g., applied to various previous reports on Super Bowl events. For instance, the group of keywords related to a Super Bowl event may include Super Bowl, Super Bowl Sunday, Big Game, halftime, the names of the teams, the names of the players, the technical terms of the game (e.g., kickoff, touchdown, field goal, foul, etc.), and so forth.

Then, monitoring module 220 can detect a moment of interest of the live event based on the NRT cue of an occurrence of a spike of one or more keywords of the group of keywords on the social networks. By way of example, monitoring module 220 is monitoring the keyword of touchdown in a Super Bowl event. A single occurrence of "touchdown" on a social network may not indicate a moment of interest of a touchdown having occurred in the game. However, if there is a spike of occurrences of "touchdown" on the social network during the game, it is more likely that people are discussing a real occurrence of a touchdown having occurred in the game. In some embodiments, a spike of occurrences of a keyword may be determined based on whether the number of occurrences of the keyword in a time window exceeds a threshold. For instance, if "touchdown" occurs more than 600 times in 60 seconds in a social network, then monitoring module 220 will alert a moment of interest of "touchdown" to encoding module 230.

In various embodiments, monitoring module 220 can also monitor various attributes of the live event broadcasting, e.g., its television coverage. Some attributes of the live event broadcasting may also be used as the cues to facilitate the determination of a moment of interest of the live event. As an example, monitoring module 220 can detect special features in a video, e.g., based on machine learning techniques to detect a feature of "soccer ball passing completely over the goal line between the goal posts" or "soccer ball hitting the net attached behind the goal frame."

As another example, monitoring module 220 can detect an instant replay, which refers to a video reproduction of what has recently occurred that was both shot and broadcast live, in a sports TV channel. Because an instant replay is usually replayed in order for viewers to see again and analyze what had just taken place, monitoring module 220 may treat the instant replay as a moment of interest. It will be appreciated that this could also be augmented by other cues occurring on social networks, such as those discussed elsewhere herein.

As yet another example, monitoring module 220 may also monitor the captions of a live broadcast. For instance, the occurrences of one or more keywords as discussed herein may be used as cues to detect moments of interest. As yet another example, monitoring module 220 may analyze audio effects either from a live broadcast or directly from sensors placed in the field. For instance, sound level or acoustic intensity during a live event may provide clues for moments of interest. Monitoring module 220 may infer a moment of interest in the game from a spike of decibels in its related audio. In other embodiments, monitoring module 220 may monitor other attributes of the broadcasting or the live event itself, so that monitoring module 220 may detect moments of interest of a live event based on various cues from various sources.

In some embodiments, monitoring module 220 may produce a probabilistic profile of possible moments of interest, e.g., by machine learning techniques. For instance, monitoring module 220 may determine a profile for a soccer game with various probabilistic distributions of possible moments of interest, e.g., goal, 60% chance; corner kick, 20% chance; kick off, 10% chance; and expulsion, 10% chance. Further, monitoring module 220 or encoding module 230 may utilize this kind of profile for monitoring or encoding snippets. As an example, a moment of interest may be boosted by a factor associated with the profile. For instance, if the moment of interest is related to goal, then its weight may be boosted by 60%.

Encoding module 230 is to encode a snippet from a transmission of the live event based on the moment of interest. For all licensed broadcasts, encoding module 230 is to use a scalable video encoding technology to consume live transmissions of various live events and create snippets thereinafter. In some embodiments, a snippet may vary from a few seconds to a few minutes based on the particular moment of interest to be captured. In other embodiments, a snippet may be less than a few seconds or more than a few minutes.

In order to create such snippets, encoding module 230 may buffer the transmission of the live event in a buffer, e.g., for the past few minutes. Further, encoding module 230 can estimate the starting time and the duration of the moment of interest. As an example, there is usually a delay between the moment of interest and the occurrence of a NRT cue on the social network. Therefore, encoding module 230 can estimate the starting time of the snippet based on the estimated delay and the time when the NRT cue occurred on the social network. Similarly, the duration of the snippet may be determined based on the duration, or quantity, of the NRT cues that occurred on the social network. For example, a longer snippet may be set for a longer duration of NRT cues or multiple NRT cues. Encoding module 230 can then encode the snippet from the buffer based on the starting point and the duration.

In some embodiments, encoding module 230 may encode the snippet as an animated GIF (.gif) file. In other embodiments, encoding module 230 may encode the snippet into any other suitable video container or technology, e.g., WebM (.webm), Windows Media Video (.wmv), Ogg Video (.ogv), AVI (.avi), Quicktime (.mov), etc.

In some embodiments, encoding module 230 may encode the snippet with a viewing limitation. Such viewing limitations may include a maximum permitted view with the snippet, user restrictions to access the snippet, allowed applications to open the snippet, etc. In some embodiments, encoding module 230 may encode the snippet with a few searchable keywords, e.g., in the metadata associated with the snippet. Therefore, the snippet may be searchable based on the searchable keywords in the metadata.

Distribution module 210 is to distribute the snippet to various destinations. In some embodiments, distribution module 210 may directly send the snippet to an end user, e.g., based on the subscription of the end user. In some embodiments, distribution module 210 may send the snippet to one or more content distributors (not shown), e.g., based on the contract of the content distributors. In some embodiments, distribution module 210 may directly send the snippet to a market place for trading such snippets In some embodiments, distribution module 210 may distribute the snippet directly or indirectly via social networks. As an example, distribution module 210 may distribute a link of the snippet (e.g., an URL) or the snippet itself to a social network. For instance, distribution module 210 may target users on the social network related to the occurrence of the spike of the keywords that were associated with the snippet. For example, one user tweeted "touchdown" in a twitter, and the twitter is received by one hundred users in the social network. Distribution module 210 may tweet the URL for the snippet about the "touchdown" to the same one hundred users. In other embodiments, distribution module 210 may distribute the snippet in other means to other destinations.

When distribution module 210 sends the snippet to a market place for trading, distribution module 210 may set up the trading price or a starting offering price for the snippet based on various attributes of the snippet. As an example, distribution module 210 may determine the trading price or the starting bid price for the snippet based on the amplitude of the spike associated with the snippet. In other words, if there was an intense discussion of the moment of interest associated with the snippet, people may be willing to pay more to view, or distribute, the snippet. In some embodiments, distribution module 210 may determine the trading price or the starting offering price for the snippet based on the maximum permitted view of the snippet. As an example, the same snippet may be encoded into multiple instances with different maximum permitted views. Thus, content distributers in the market place may purchase or bid on the same snippet with a suitable price based on the maximum permitted views. In some embodiments, distribution module

210 may distribute a group of snippets together in a bundle, e.g., based on a snippet family. A snippet family may include various snippets associated with the same live event, e.g., a Super Bowl event. A snippet family may include snippets from different live events, but share a common attribute, e.g., share the keyword of "football" in their metadata. In this case, a content distributor in the market place may bid on the keyword of "football" and get a bunch of snippets related to "football".

In the market place, distribution module 210 may distribute the snippet to the highest bidder (e.g., a content distributor) in a real-time automated auction. The content distributor may in turn adaptively determine a price for the snippet based on the demand-price relationship to maximize the overall revenue or profit. As an example, sought after snippets can be priced higher than ordinary snippets. For instance, a snippet of the seconds leading up to a goal and the goal during a soccer game is likely priced higher than snippets captured from mid-field plays. In other embodiments, distribution module 210 may distribute the snippet based on an arrangement. As an example, a content distributor may agree to pay a premium price ahead of an event for the exclusive rights or other kinds of privileges associated with the snippets pertaining to the event. Thus, distribution module 210 may distribute the snippets pertaining to the event to this particular content distributor according to the special arrangement.

Data module 240 provides data services to monitoring module 220, encoding module 230, or distribution module 210, e.g., to facilitate monitoring a social network, encoding a snippet, storing the snippet, distributing the snippet, etc. Data module 240 may be located in the same apparatus as other modules, e.g., in server 162 of FIG. 1. Data module 240 may be located in a different server in other embodiments, e.g., in data server 164 of FIG. 1. In various embodiments, data module 240 may provide one or more buffers to retain various data, e.g., a few minutes of recently transmitted broadcasting data of a live event, the recently encoded snippets, the account information of users subscribed to receive snippets, etc.

In various embodiments, apparatus 200 may be implemented differently than depicted in FIG. 2. As an example, monitoring module 220 can be combined with encoding module 230 to form a comprehensive module to detect moments of interest and encode related snippets accordingly. In some embodiments, components depicted in FIG. 2 can have a direct or indirect connection not shown in FIG. 2. In some embodiments, some of the components depicted in FIG. 2 may be divided into multiple modules. Further, one or more components of apparatus 200 may be located across any number of different devices or networks. As an example, data module 240 may be implemented as an integrated subsystem of a data server (e.g., data server 164 of FIG. 1) rather than located in apparatus 200.

Advantageously, apparatus 200 may detect a moment of interest in a live event and encode a snippet based on, e.g., one or more NRT cues in a social network. Then, the snippet, which may last a few seconds to a few minutes, may be made available to users, either directly or indirectly through a content distributor who may have purchased the snippet. In various embodiments, a user may access the snippet, e.g., via an app on a smartphone, seconds or minutes after the snippet becomes available. In implementation, the app may have multiple channels to which the user can subscribe. Once the user has subscribed to a channel, the snippets fed to the channel may be automatically pushed to the user. So the user may be notified for a new snippet in the channel seconds or minutes after the moment of interest of the live event was broadcasted. In other embodiments, the snippets fed to the channel may be pulled based on a request by the user, or the user's device.

Figure 3:
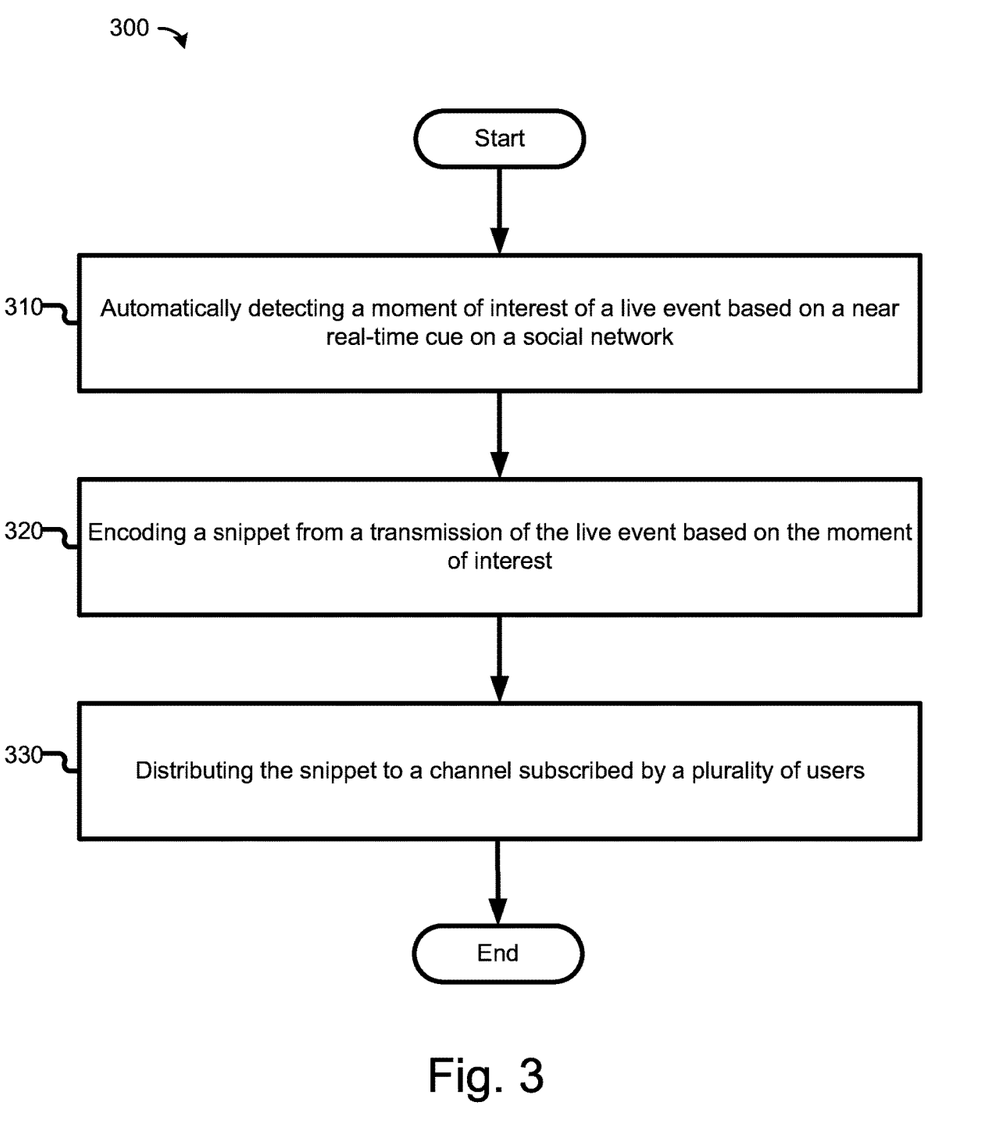
FIG. 3 is a flow diagram of an example process for encoding and distributing selective snippets of live events, which may be practiced by an example apparatus, incorporating aspects of the present disclosure, in accordance with various embodiments.

Referring now to FIG. 3, which represents a flow diagram of an example process 300 for encoding and distributing selective snippets of live events, which may be practiced by an example apparatus in accordance with various embodiments. Process 300 may be performed by processing logic that comprises hardware (e.g., circuitry, dedicated logic, programmable logic, microcode, etc.), software (e.g., instructions run on a processing device to perform hardware simulation), or a combination thereof. The processing logic is to be configured to encode and distribute snippets of live events. As such, process 300 may be performed by a computing device, e.g., apparatus 200, to implement one or more embodiments of the present disclosure. In various embodiments, process 300 can have fewer or additional operations, or perform some of the operations in different orders.

In various embodiments, the process begins at block 310, where a moment of interest of a live event may be automatically detected based on a NRT cue on a social network, e.g., by monitoring module 220 in apparatus 200 of FIG. 2. In various embodiments, the NRT cue may include an occurrence of a spike of one or more keywords on the social networks. As an example, during a football game, a spike of a keyword may refer to the same keyword related to the football game that appeared in many users' messages on various social networks within a short period. In turn, the spike of the keyword may be automatically monitored or detected as a NRT cue for a moment of interest just happened in the football game.

Next, at block 320, a snippet from a transmission of the live event may be encoded based on the detected moment of interest at block 310. In some embodiments, the encoding process may include selecting a starting point of the moment of interest and a duration of the moment of interest based on, e.g., a machine-learning algorithm, a heuristic model, a statistical model, manual selection, etc. In some embodiments, a delay between the moment of interest and the NRT cue on the social network may be estimated, so that the starting point of the moment of interest may be determined based at least in part on the estimated delay.

As an example, it may be learned based on historical data that the last ten seconds leading to a touchdown event in a football game is desired by many football fans. Further, it may be further learned that the statistical delay between a "touchdown" event and the spike of the keyword of "touchdown" on a social network is three seconds. In this case, the snippet may be encoded for ten seconds, starting from thirteen seconds before the time of the spike.

In some embodiments, the encoding process may include selecting a starting point of the moment of interest and a duration of the moment of interest based on an audio segment associated of the moment of interest. Speech of a live event may be transcribed into text, e.g., based on real-time speech to text technologies. Therefore, the moment of interest of the live event may be detected by analyzing the text transcribed from the speech. Further, sound level or acoustic intensity during a live event may also provide clues for moments of interest. For instance, a spike of decibels during a game can often reflect an excitement of the game, which may indicate a moment of interest of the game. Accordingly, the starting point of the moment of interest and the duration of the moment of interest may also be determined based on such audio analysis.

In some embodiments, the encoding process may include selecting a starting point of the moment of interest and a duration of the moment of interest based on the captions associated with the moment of interest. Similarly, the analysis of the captions of a live event, if available, may also provide clues for detecting a moment of interest and various attributes of the moment of interest. For instance, the occurrences of one or more keywords related to the moment of interest in the captions may be used as clues to determine the starting point of the moment of interest and the duration of the moment of interest.

In some embodiments, the encoding process may include selecting a starting point of the moment of interest and a duration of the moment of interest based on a replay of the moment of interest on the transmission of the live event. An instant replay may be automatically detected, e.g., based on the video analysis on a sequence of duplicated video frames. Often, an instant replay of a game may also include a slow motion segment. Therefore, a slow motion segment of an instant replay may well provide another indication of the moment of interest. In one embodiment, the instant replay or the slow motion segment of the instant replay may be encoded as a snippet. In other embodiments, the starting point and duration of the moment of interest may be determined without replays, captions, audio, etc., instead, based on video features in the video, e.g., recognized by object recognition techniques or machine learning techniques.

Next, at block 330, the snippet may be distributed to a channel subscribed by one or more users. The channel could be a topic-based channel, e.g., a channel of a sport or a channel of a type of concert. The channel could be a dedicated channel for a specific live event, e.g., a channel for the Super Bowl. In various embodiments, a user may subscribe to one or more channels, e.g., via an app on a smartphone. As the channel subscribed by the user is replenished by a new snippet, the user may receive a notification regarding the newly arrived snippet, e.g., a snippet notification on the notification panel of the smartphone. When the user issues a command to view the snippet, the snippet may then be delivered to the user, e.g., by a content provider via a computing cloud.

Figure 4:
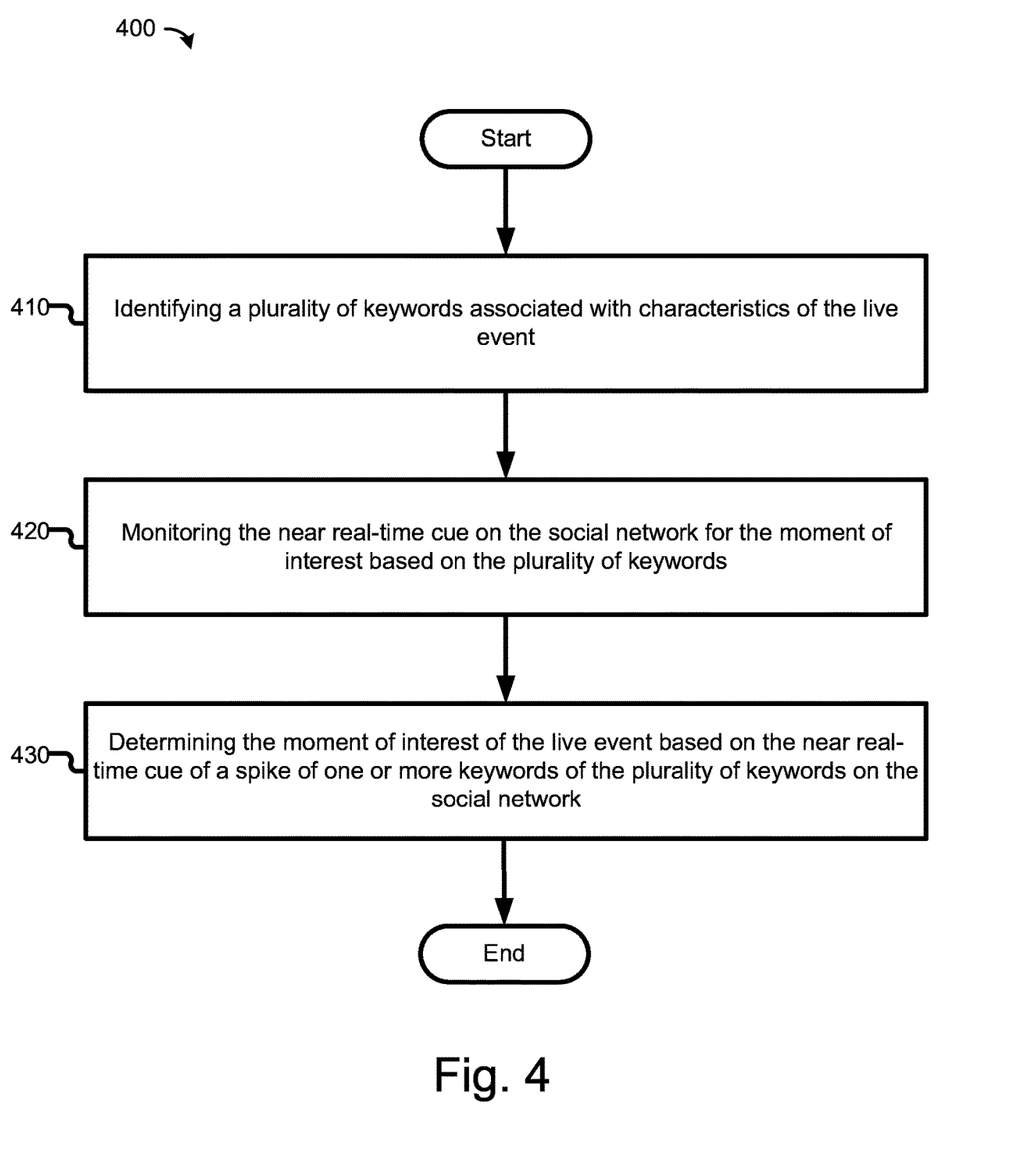
FIG. 4 is a flow diagram of an example process for detecting a moment of interest of a live event, which may be practiced by an example apparatus, incorporating aspects of the present disclosure, in accordance with various embodiments.

Referring now to FIG. 4, which represents a flow diagram of an example process 400 for detecting a moment of interest of a live event, which may be practiced by an example apparatus in accordance with various embodiments. As shown, process 400 may be performed by apparatus 200 of FIG. 2 to implement one or more embodiments of the present disclosure. Similar to process 300, in various embodiments, process 400 can have fewer or additional operations, or perform some of the operations in different orders. In some embodiments, process 400 is executed in connection with block 310 of FIG. 3.

In various embodiments, the process begins at block 410, where a set of keywords associated with various characteristics of the live event may be identified, e.g., by monitoring module 220 in apparatus 200 of FIG. 2. In some embodiments, the set of keywords may be manually selected by an expert for a live event. In some embodiments, the set of keywords may be automatically generated, e.g., based on statistically significant keywords detected on historical reports on the similar events. The set of keywords may be associated with various characteristics of the live event. For example, game-specific keywords may be chosen for a game; political jargon may be chosen for a political debate or a legislative session; etc. It will be appreciated that, although sporting events are discussed extensively herein, that this is merely meant to be illustrative. Any live event is contemplated as being within the scope of this disclosure. In addition, the event need not be live, as in occurring at the time of airing or distribution, and instead could be a pre-recorded video (e.g., sitcom, drama, reality television, etc.).

Next, at block 420, the NRT cue on the social network for the moment of interest may be monitored or detected based on the set of keywords. In various embodiments, a spike of one or more keywords of the set of keywords on the social network may be detected as a NRT cue of the moment of interest. In some embodiments, the social network activities of subscribers of a particular channel are monitored for distributing relevant snippets to these subscribers. By way of example, the messages posted by subscribers on a social network may be given more weight compared to messages posted by non-subscribers in calculating the spike of a keyword. For instance, a message posted by a subscriber including the keyword may be multiplied by a factor in calculating the amplitude of the spike.

Next, at block 430, the moment of interest of the live event may be determined based on the NRT cue. In various embodiments, a threshold frequency of keywords occurrence in a social network may be predetermined. The frequency may be specific to the live event. As an example, basketball is a relatively fast game with many scoring opportunities. Thus, the threshold frequency for a basketball game may be set as a moderate occurrence of a keyword in a short period, e.g., 30 seconds. As another example, soccer is also a relatively fast game but with only a few scoring opportunities. Thus, the threshold frequency for a soccer game may be set as a high occurrence of a keyword (e.g., goal) in a longer period, e.g., 1 minute or longer, assuming people will continue to talk about a goal event in social networks after one minute. In some embodiments, different threshold frequencies are set for different keywords. The actual frequency of occurrences of a keyword in a social network may be compared with its related threshold frequency. In various embodiments, the frequency of occurrences of the keyword greater than its related threshold frequency may be deemed as a spike, which in turn may trigger further analysis and detection of a moment of interest related to such spike.

Figure 5:
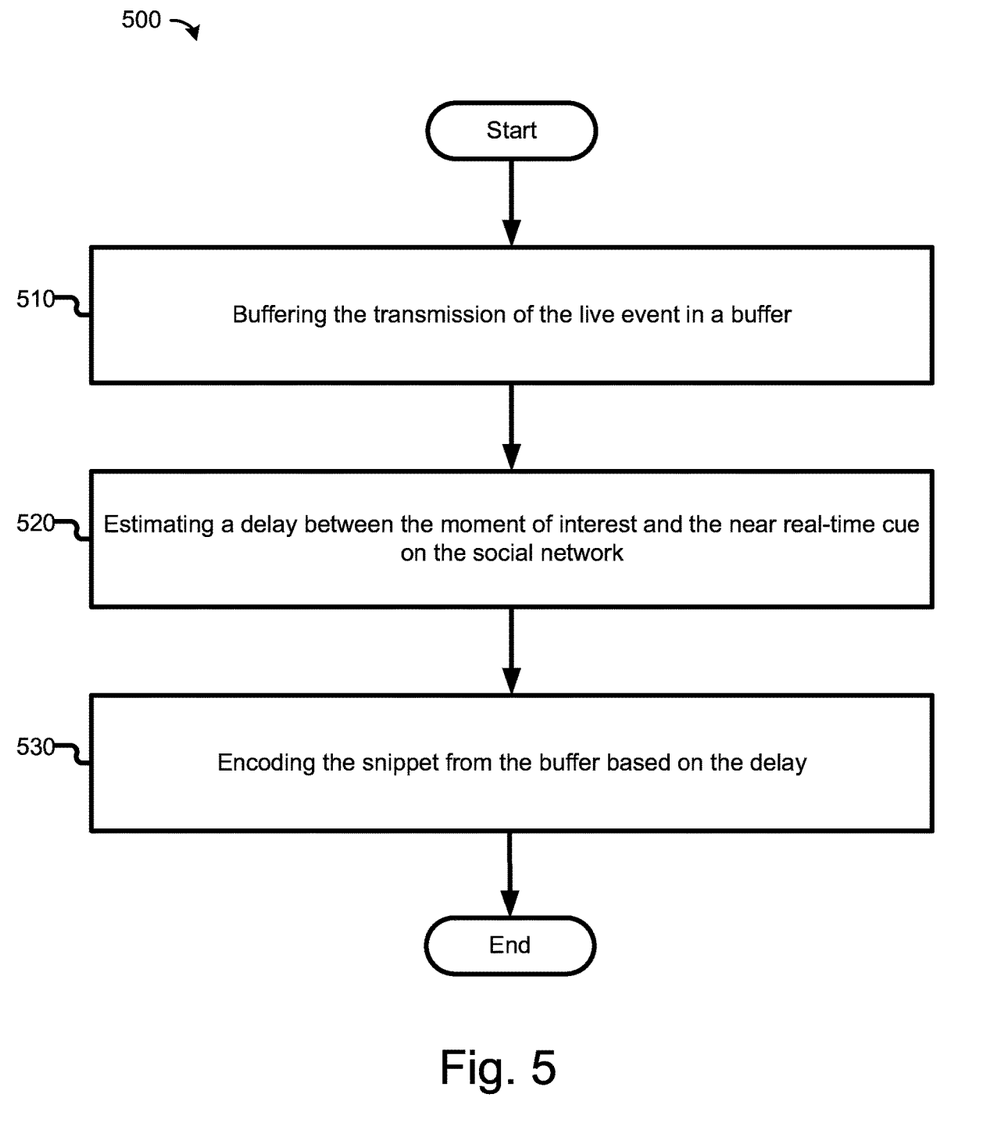
FIG. 5 is a flow diagram of an example process for encoding the moment of interest of a live event, which may be practiced by an example apparatus, incorporating aspects of the present disclosure, in accordance with various embodiments.

Referring now to FIG. 5, it is a flow diagram of an example process 500 for encoding a moment of interest of a live event, which may be practiced by an example apparatus in accordance with various embodiments. As shown, process 500 may be performed by apparatus 200 of FIG. 2 to implement one or more embodiments of the present disclosure. Similar to process 400, in various embodiments, process 500 can have fewer or additional operations, or perform some of the operations in different orders. In some embodiments, process 500 is executed in connection with block 320 of FIG. 3.

In various embodiments, process 500 begins at block 510, where the transmission of the live event may be saved in a buffer, e.g., set by data module 240 or encoding module 230 in apparatus 200 of FIG. 2. In some embodiments, different buffers may be established for different live events.

Process 500 continues at block 520, where a delay between the moment of interest and the NRT cue on the social network may be estimated, e.g., by encoding module 230 in apparatus 200 of FIG. 2. Encoding module 230 may allow an expert to manually set the delay, e.g., based on the type of live event, the type of keywords, the type of transmission, etc. In some embodiments, such delay between the moment of interest and the NRT cue on the social network may be statistically computed based on past similar live events. As an example, messages from the social network during a past similar live event may be analyzed, and the actual delay between a similar moment of interest and an analogous NRT cue may be learned. Such learned knowledge may be applied in estimating analogous delays during future live events.

Next, process 500 continues to block 530, where the snippet from the buffer may be encoded based on the delay, e.g., by encoding module 230 in apparatus 200 of FIG. 2. The delay may be added to the time of the NRT cue to estimate the starting time of the moment of interest, so that the snippet may be encoded properly from a proper starting time. As an example, if the delay is three seconds, and the spike happened three seconds ago, then the snippet may be encoded starting from six seconds ago.

Figure 6:
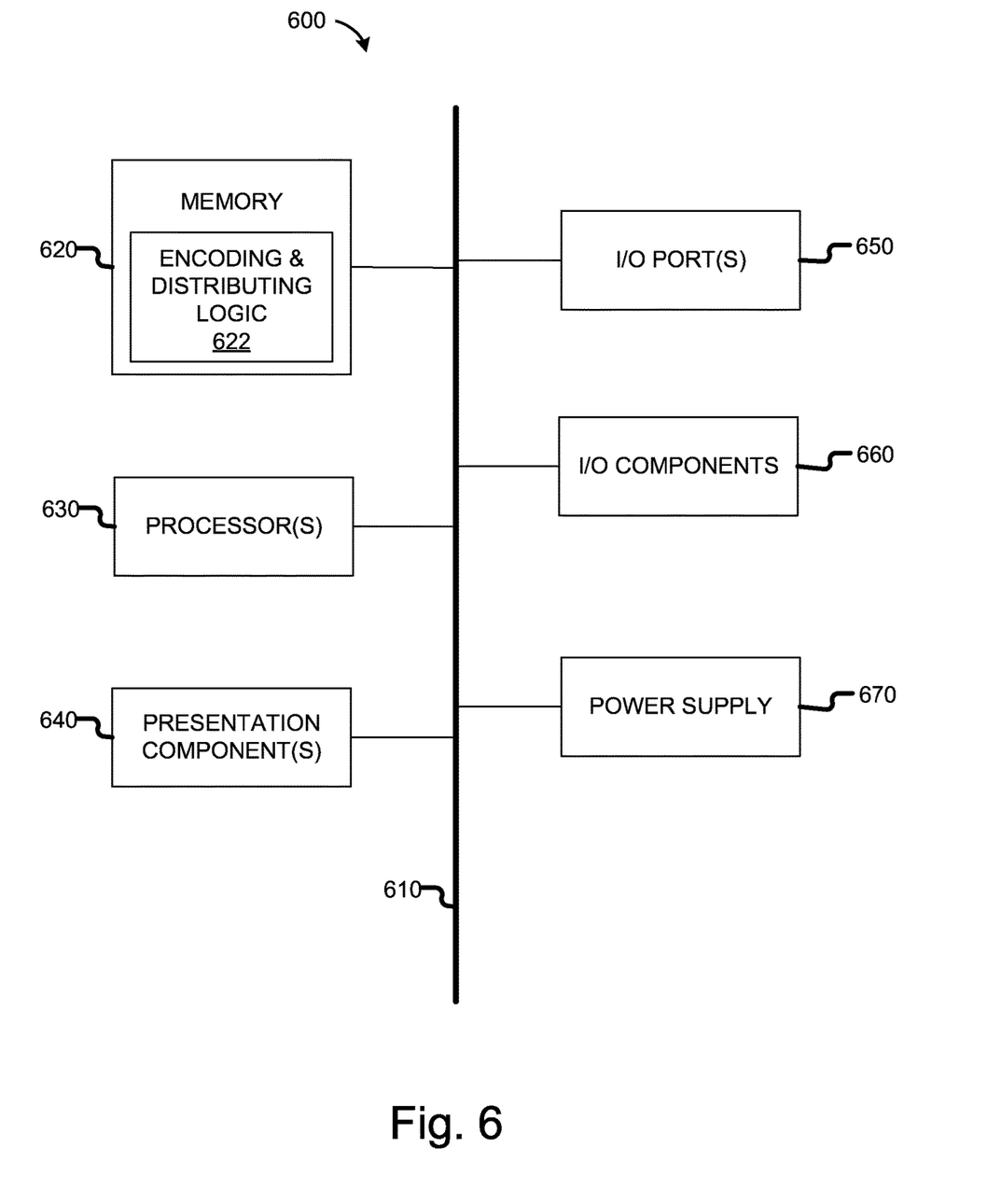
FIG. 6 illustrates an example computing device suitable for practicing the disclosed embodiments, in accordance with various embodiments.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 620, one or more processors 630, one or more presentation components 640, input/output (I/O) ports 650, input/output components 660, and an illustrative power supply 670. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 620 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 620 or I/O components 660. Presentation component(s) 640 present data indications to a user or other device. Exemplary presentation components include a display device, speaker, printing component, vibrating component, etc.

In various embodiments, memory 620 includes, in particular, temporal and persistent copies of encoding and distributing logic 622. Encoding and distributing logic 622 includes instructions that, when executed by one or more processors 630, result in computing device 600 providing encoding and distributing selective snippets of live events, such as, but not limited to, process 300, process 400, and process 500. In various embodiments, encoding & distributing logic 622 includes instructions that, when executed by processor 610, result in computing device 600 performing various functions associated with, such as, but not limited to, distribution module 210, monitoring module 220, encoding module 230, data module 240, in connection with FIG. 2.

In some embodiments, one or more processors 630 may be packaged together with encoding and distributing logic 622. In some embodiments, one or more processors 630 may be packaged together with encoding & distributing logic 622 to form a System in Package (SiP). In some embodiments, one or more processors 630 can be integrated on the same die with encoding & distributing logic 622. In some embodiments, processor 610 can be integrated on the same die with encoding & distributing logic 622 to form a System on Chip (SoC).

I/O ports 650 allow computing device 600 to be logically coupled to other devices including I/O components 660, some of which may be built in. Illustrative components include a microphone, joystick, game pad, satellite dish, scanner, printer, wireless device, etc. The I/O components 660 can also provide a natural user interface (NUI) that processes air gestures, voice, or other physiological inputs generated by a user. In some embodiments, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A computer-implemented method, comprising:
   automatically detecting a moment of interest, that occurred in an event being broadcast, based on a near real-time cue on a social network, wherein the event is a type of event and the moment of interest is a type of moment of interest;
   responsive to detecting the moment of interest that occurred in the event being broadcast:
      determining one or more past events, different than the event being broadcast, that were previously broadcast and are the same type of event as the event being broadcast;
      determining one or more moments of interest, different than the moment of interest that occurred in the event, that:
         are the same type of moment of interest as the moment of interest that occurred in the event being broadcast; and
         occurred in the one or more past events that were previously broadcast and are the same type of event as the event being broadcast;
      determining one or more messages, of the social network, that are associated with the one or more moments of interest that:
         are the same type of moment of interest as the moment of interest that occurred in the event being broadcast; and
         occurred in the one or more past events that were previously broadcast and are the same type of event as the event being broadcast;
      estimating a delay between the moment of interest that occurred in the event being broadcast and the near real-time cue on the social network based on an analysis of the one or more messages associated with the one or more moments of interest that:
         are the same type of moment of interest as the moment of interest that occurred in the event being broadcast; and
         occurred in the one or more past events that were previously broadcast and are the same type of event as the event being broadcast; and
      based on the delay, encoding a snippet, comprising a video clip, from a transmission of the event being broadcast, wherein the transmission of the event being broadcast is a broadcast different than the social network associated with detecting the moment of interest that occurred in the event being broadcast; and
   distributing the snippet, comprising the video clip, to a channel of one or more social networks subscribed to by a plurality of users.

2. The method of claim 1, further comprising:
   identifying a plurality of keywords associated with characteristics of the event;
   monitoring the near real-time cue on the social network for the moment of interest based on the plurality of keywords; and
   determining the moment of interest that occurred in the event based on the near real-time cue of a spike of one or more keywords of the plurality of keywords on the social network.

3. The method of claim 2, wherein the determining comprises comparing a frequency of the one or more keywords in a part of the social network with a threshold frequency.

4. The method of claim 1, comprising:
   buffering the transmission of the event in a buffer; and
   encoding the snippet from the buffer based on the delay.

5. The method of claim 1, wherein the encoding comprises selecting a starting point of the moment of interest and a duration of the moment of interest based on a machine learning algorithm.

6. The method of claim 1, wherein the encoding comprises selecting a starting point of the moment of interest and a duration of the moment of interest based on an audio segment associated with the moment of interest.

7. The method of claim 1, wherein the encoding comprises selecting a starting point of the moment of interest and a duration of the moment of interest based on a caption segment associated with the moment of interest.

8. The method of claim 1, wherein the encoding comprises selecting a starting point of the moment of interest and a duration of the moment of interest based on a replay of the moment of interest on the transmission of the event.

9. A system, comprising:
   one or more processors; and
   memory comprising instructions that when executed by the one or more processors perform operations comprising:

monitoring a cue on a social network for a moment of interest of a live event, wherein the live event is a type of event and the moment of interest is a type of moment of interest;
buffering a transmission of the live event in a buffer;
responsive to detecting the moment of interest:
  estimating a delay between the moment of interest and the cue on the social network based on historical data associated with the moment of interest, wherein the historical data corresponds to one or more moments of interest that:
    are the same type of moment of interest as the moment of interest of the live event; and
    occurred in one or more past events that are the same type of event as the live event; and
  based on the delay, encoding a snippet, comprising a video clip, from the buffer; and
distributing the snippet, comprising the video clip, to a plurality of users.

10. The system of claim 9, wherein the operations comprise identifying a plurality of keywords associated with characteristics of the live event; and
  determining the moment of interest of the live event based on the cue of an occurrence of a spike of one or more keywords of the plurality of keywords on the social network.

11. The system of claim 10, wherein the operations comprise enabling the snippet to be searchable based on the one or more keywords.

12. The system of claim 10, wherein the operations comprise distributing a link of the snippet or the snippet to the plurality of users on the social network associated with the occurrence of the spike of the one or more keywords.

13. The system of claim 9, wherein the distributing comprises distributing the snippet to one or more social networks subscribed to by the plurality of users.

* * * * *